(12) United States Patent
Sun et al.

(10) Patent No.: US 12,155,709 B2
(45) Date of Patent: *Nov. 26, 2024

(54) ASSET METADATA SERVICE

(71) Applicant: Conviva Inc., Foster City, CA (US)

(72) Inventors: Chang Sun, Beijing (CN); Lei Cao, Langfang (CN); Ningning Hu, San Jose, CA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,295

(22) Filed: Oct. 10, 2023

(65) Prior Publication Data

US 2024/0155015 A1 May 9, 2024

Related U.S. Application Data

(63) Continuation of application No. 17/431,554, filed as application No. PCT/CN2019/092363 on Jun. 21, 2019, now Pat. No. 11,838,343.

(51) Int. Cl.
*H04L 65/612* (2022.01)
*H04N 21/435* (2011.01)
*H04N 21/442* (2011.01)
*H04N 21/658* (2011.01)

(52) U.S. Cl.
CPC ......... *H04L 65/612* (2022.05); *H04N 21/435* (2013.01); *H04N 21/44204* (2013.01); *H04N 21/6582* (2013.01)

(58) Field of Classification Search
CPC ... H04L 65/612; H04L 67/535; H04N 21/435; H04N 21/44204; H04N 21/6582; H04N 21/2353
See application file for complete search history.

(56) References Cited

U.S. PATENT DOCUMENTS

| | | |
|---|---|---|
| 8,572,483 B1 | 10/2013 | Dilorenzo |
| 8,782,701 B2 | 7/2014 | Yu |
| 9,602,850 B2 | 3/2017 | Qian |
| 2008/0005132 A1 | 1/2008 | Herbeck |
| 2010/0036909 A1 | 2/2010 | Lee |
| 2011/0055176 A1 | 3/2011 | Choi |
| 2014/0074894 A1 | 3/2014 | Han |
| 2014/0337808 A1 | 11/2014 | Armitage |
| 2016/0055241 A1 | 2/2016 | Gower |
| 2017/0250882 A1 | 8/2017 | Kellicker |
| 2021/0117472 A1 | 4/2021 | Guillen |

FOREIGN PATENT DOCUMENTS

CN 105323622 2/2016

*Primary Examiner* — Adil Ocak
(74) *Attorney, Agent, or Firm* — Van Pelt, Yi & James LLP

(57) ABSTRACT

Establishing a data store of content metadata includes receiving, from a content player executing on a client device, an indication of content played by the content player, the indication comprising one or more pieces of metadata associated with the content. It further includes selecting a set of one or more rules applicable to parsing the metadata associated with the content. It further includes processing the metadata at least in part by applying the selected parsing rules to at least a portion of the metadata associated with the content. It further includes storing, to a data store, at least some of the processed metadata associated with the content.

21 Claims, 11 Drawing Sheets

```
"AcmeObjectId": {
  "re": [
    "\\S+\\|\\|\\s(?P<seriesName>.*)\\s?-\\sS(?P<seasonNumber>\\d+):E(?P<episodeNumber>\\d+)\\s-\\s(?P<name>.*)",
    "(?P<seriesName>.*)\\s?-\\sS(?P<seasonNumber>\\d+):E(?P<episodeNumber>\\d+)\\s-\\s(?P<name>.*)",
    "\\S+\\|\\|\\s(?P<seriesName>.*)\\s?-\\sS(?P<seasonNumber>\\d+)\\s-\\s(?P<name>.*)",
    "(?P<seriesName>.*)\\s?-\\sS(?P<seasonNumber>\\d+)\\s-\\s(?P<name>.*)",
    "\\S+\\|\\|\\s(?P<seriesName>.*)\\s-\\sS(?P<seasonNumber>\\d+)\\s-\\s(?P<name>.*)",
    "\\S+\\|\\|\\s(?P<seriesName>.*)\\s-\\s(?P<name>.*)",
    "\\S+\\|\\|\\s(?P<seriesName>.*)\\s-\\s(?P<seriesName>.*)",
    "\\S+\\|\\|\\s*(?P<seriesName>.*)\\s-\\s(?P<name>.*)",
    "(?P<seriesName>.*)\\s-\\s(?P<name>.*)",
    "-\\s(?P<seriesName>.*)\\s-",
    "(?P<seriesName>.*)\\s-",
    "(?P<default>.*)"
  ],
  "groupMapping": {
    "default": "assetField.name",
    "name": "assetField.name",
    "seriesName": "assetField.seriesName",
    "seasonNumber": "assetField.seasonNumber",
    "episodeNumber": "assetField.episodeNumber"
  }
},
```

```
"GammaObjectId": {
    "re": [
        "\\[\\s+\\]\\s*(?P<seriesName>.*)",
        "(?P<default>.*)"
    ],
    "groupMapping": {
        "seriesName": "assetField.seriesName",
        "default": "assetField.name"
    }
},
```

FIG. 4B

```
"BetaObjectId": {
    "re": ["(?P<videoType>.*)\\s+\\\\\\s+(?P<channelName>.*)\\s+\\\\\\s+(?P<seriesName>.*)\\s+\\\\\\
s+(?P<name>.*)\\s+\\\\\\s+S(?P<seasonNumber>\\d+)E(?P<episodeNumber>\\d+)"],
    "groupMapping": {
        "videoType": "assetField.contentType",
        "seriesName": "assetField.seriesName",
        "name": "assetField.name",
        "seasonNumber": "assetField.seasonNumber",
        "episodeNumber": "assetField.episodeNumber"
    }
}
```

FIG. 4C

```
"1234567890": {                           502
    "source": "conviva",          504
    "brand": "AcmePlus",    506
    "extractionRules": {
        "objectId": {
            "predefinedRule": "AcmeObjectId"    510
        },
        "customerTags._showTitle": {
            "fieldName": "assetField.showTitle"
        },
        "customerTags._seasonNumber": {
            "fieldName": "assetField.seasonNumber"
        },
        "customerTags._seriesName": {
            "fieldName": "assetField.seriesName"
        },
        "customerTags.name": {
            "re": "(?P<name>.*)",
            "groupMapping": {"name": "assetField.name"}
508     },
        "customerTags._episodeNumber": {
            "fieldName": "assetField.episodeNumber"
        },
        "customerTags.genre": {
            "fieldName": "assetField.genreList"
        },
        "customerTags.pubDate": {
            "fieldName": "assetField.seriesPremiere"
        },
        "customerTags.contentType": {
            "fieldName": "assetField.categoryType"
        },
        "defaultValues.videoType": {
            "fieldValue": "VOD"
        }
    },
    "fieldPriority": {
        "assetField.seasonNumber": ["customerTags._seasonNumber", "objectId"],
        "assetField.episodeNumber": ["customerTags._episodeNumber", "objectId"],
        "assetField.showTitle": ["customerTags._showTitle", "objectId"],
        "assetField.name": ["objectId", "customerTags.name"],
512     "assetField.seriesName": ["customerTags._seriesName","objectId"],
        "assetField.genreList": ["customerTags.genre"],
        "assetField.seriesPremiere": ["customerTags.pubDate"],
        "assetField.contentType": ["defaultValues.videoType"],
        "assetField.categoryType": ["customerTags.contentType"]
    },
    "fieldReassign":{
514     "assetField.name": ["assetField.seriesName"]
    },
    "aliasFields": [
        "assetField.seriesName",
516     "assetField.seasonNumber",
        "assetField.episodeNumber",
        "assetField.name"]
    },
```

FIG. 5A

```
"7356819202": {
  "source": "conviva",
  "brand": "AcmeDrama",
  "extractionRules": {
    "objectId": {
      "predefinedRule": "AcmeObjectId"     522
    },
    "customerTags._showTitle": {
      "fieldName": "assetField.showTitle"
    },
    "customerTags._seasonNumber": {
      "fieldName": "assetField.seasonNumber"
    },
    "customerTags._seriesName": {
      "fieldName": "assetField.seriesName"
    },
    "customerTags.name": {
      "re": "(?P<name>.*)",
      "groupMapping": {"name": "assetField.name"}
    },
    "customerTags._episodeNumber": {
      "fieldName": "assetField.episodeNumber"
    },
    "customerTags.genre": {
      "fieldName": "assetField.genreList"
    },
    "customerTags.pubDate": {
      "fieldName": "assetField.seriesPremiere"
    },
    "customerTags.contentType": {
      "fieldName": "assetField.categoryType"
    },
    "defaultValues.videoType": {
      "fieldValue": "VOD"
    }
  },
  "fieldPriority": {
    "assetField.seasonNumber": ["customerTags._seasonNumber", "objectId"],
    "assetField.episodeNumber": ["customerTags._episodeNumber", "objectId"],
    "assetField.showTitle": ["customerTags._showTitle", "objectId"],
    "assetField.name": ["objectId", "customerTags.name"],
    "assetField.seriesName": ["customerTags._seriesName","objectId"],
    "assetField.genreList": ["customerTags.genre"],
    "assetField.seriesPremiere": ["customerTags.pubDate"],
    "assetField.contentType": ["defaultValues.videoType"],
    "assetField.categoryType": ["customerTags.contentType"]
  },
  "fieldReassign":{
    "assetField.name": ["assetField.seriesName"]
  },
  "aliasFields": [
    "assetField.seriesName",
    "assetField.seasonNumber",
    "assetField.episodeNumber",
    "assetField.name"]
}
```

FIG. 5B

```
"5498763125": {
  "source": "conviva",
  "brand": "Beta",
  "extractionRules": {
    "objectId": {
      "predefinedRule": "BetaObjectId"
    },
    "customerTags.content_length_sec": {
      "fieldName": "assetField.contentLengthSec"
    }
  },
  "fieldPriority": {
    "assetField.episodeNumber": ["objectId"],
    "assetField.seasonNumber": ["objectId"],
    "assetField.seriesName": ["objectId"],
    "assetField.name": ["objectId"],
    "assetField.contentType": ["objectId"],
    "assetField.contentLengthSec": ["customerTags.content_length_sec"]
  },
  "aliasFields": [
    "assetField.seriesName",
    "assetField.seasonNumber",
    "assetField.episodeNumber",
    "assetField.name"]
}
```

{ 542 } covers the top section; { 544 } covers the fieldPriority/aliasFields section.

FIG. 5C

ASSET METADATA SERVICE

CROSS REFERENCE TO OTHER APPLICATIONS

This application is a continuation of U.S. patent application Ser. No. 17/431,554, entitled ASSET METADATA SERVICE filed Aug. 17, 2021 which is incorporated herein by reference for all purposes, which claims priority to International (PCT) Application No. PCT/CN19/92363 entitled ASSET METADATA SERVICE, filed Jun. 21, 2019 which is incorporated herein by reference for all purposes.

BACKGROUND OF THE INVENTION

Users are increasingly using networks such as the Internet to access content, such as video files and live streaming/video on demand content, via client machines. As demand for such content increases, video publishers and content providers wish to better understand how that content is streamed. However, the manner in which publishers and providers describe their content is full of ambiguity and inconsistency (with every publisher, for example, having their own naming convention for video attributes), limiting the insights that can be gained for the streaming content.

BRIEF DESCRIPTION OF THE DRAWINGS

Various embodiments of the invention are disclosed in the following detailed description and the accompanying drawings.

FIG. 4A illustrates an embodiment of predefined metadata parsing and mapping rules.

FIG. 4B illustrates an embodiment of predefined metadata extraction and mapping rules.

FIG. 4C illustrates an embodiment of predefined metadata extraction and mapping rules.

FIG. 5A illustrates an embodiment of logic for processing metadata for an entity.

FIG. 5B illustrates an embodiment of logic for processing metadata for an entity.

FIG. 5C illustrates an embodiment of logic for processing metadata for an entity.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In existing streaming analytics systems, the ambiguity and inconsistency of publisher (and/or streaming service/distributor)-provided video attributes results in various challenges in understanding the performance of streamed content. For example, the video attributes defined by content providers may have gaps in metadata, incorrect metadata, different naming conventions for metadata, etc., where such issues prevent applications from obtaining clean, consistent, and standardized/normalized asset metadata on which to perform analysis of the content.

Figure 1:
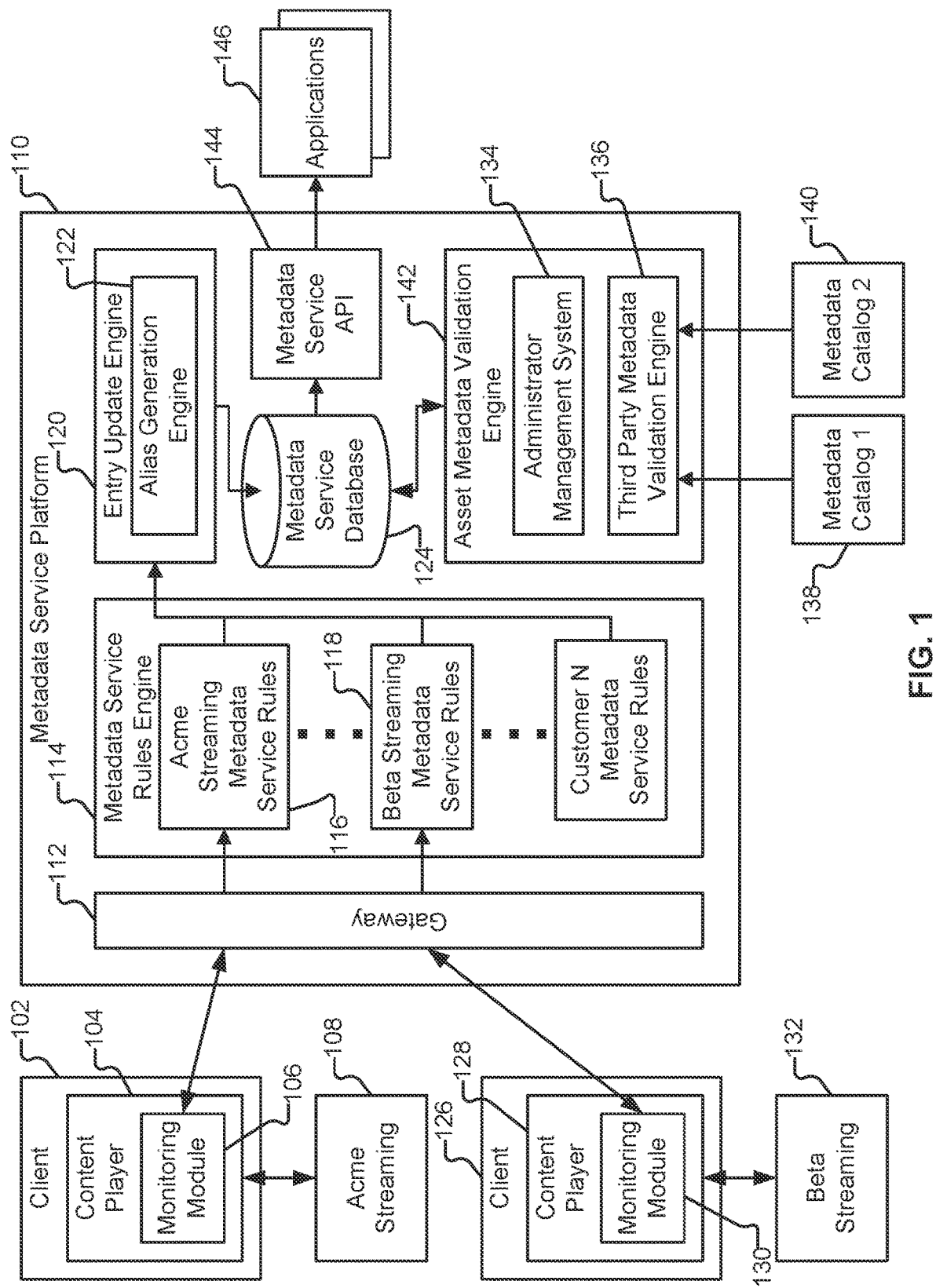
FIG. 1 illustrates an embodiment of an environment in which metadata services are provided.

FIG. 1 illustrates an embodiment of an environment in which metadata services are provided. As will be described in further detail below, the metadata service described herein provides a solution to the aforementioned problems of ambiguity and inconsistency in video attribute metadata by uniformly collecting and cleaning the video metadata reported by publishers (e.g., by correcting errors in metadata and completing gaps in metadata), and then extracting and storing a set of normalized asset metadata under a unified standard. As will be described in further detail below, the metadata service also provides a set of real time interfaces usable to access the normalized asset metadata.

While example embodiments in a video streaming (e.g., live and on-demand streaming) ecosystem are described throughout, the techniques described herein can variously be adapted to accommodate any type of audiovisual or multimedia content distribution, as applicable. For example, the techniques described herein may be used to organically build, maintain, and validate a data store of any other type of content, as applicable.

In the example of FIG. 1, suppose that a user of client 102 wishes to stream an episode of a video series. In particular, the user would like to watch the eighteenth episode of the seventh season of the series "The Everything Show," where the title of the episode is "Nothing At All." In this example, the user of client 102 is a subscriber to streaming service "Acme Streaming" (108), which has the series in its catalog of content available for streaming. Examples of clients include devices such as personal computers, laptops, cellular phones/personal digital assistants, smart displays, smartphones, tablets, phablets, and other types of information appliances such as set-top boxes, game consoles, broadband routers, file servers, video servers, and digital video recorders, as applicable. Acme Streaming is also referred to herein as a type of "content provider" or "content publisher."

In this example, client 102 includes a content player application 104 which in turn incorporates monitoring module 106. Content is received (e.g., over a network such as the Internet) by the player from Acme Streaming (where, for example, the player application is part of a standalone application of the Acme Streaming service). In other embodiments, the client may include a web browser application (that receives and plays content from the streaming service) which in turn incorporates a monitoring module that communicates with the metadata service platform. Monitoring module 106 (which may be implemented as a software development kit (SDK), library, etc.) is in communication (e.g., over a network such as the Internet) with Metadata Service Platform 110. In this example, Acme Streaming is a customer or subscriber of the services provided by the metadata services platform.

In this example, the user of client 102 selects the episode for playback and initiates a content viewing session to begin streaming and watching the episode (e.g., by hitting "play" in the application). As used herein, a session refers to an entity representing an instance of a user's playback interactions with a content asset. The session may begin with a user's request for a particular content, and end when the user ceases playing the content (e.g., the user stops watching a requested video).

The monitoring module is configured to collect status information about the viewing session and provide that status information (also referred to herein as a "heartbeat"), on a recurring basis, to metadata service platform 110. The status information includes video asset metadata. For example, when the video session starts or the viewer selects the content to watch, the monitoring library obtains the metadata for the asset being played. In this example, the video asset metadata includes catalog-type data describing the asset that was requested and being watched during the session, where the catalog-type metadata is defined and reported by the streaming service (which may also be the publisher and/or a distributor of the content asset) in a set of key-value pairs that are also referred to herein as "customer tags." Examples of video asset metadata or attributes include show title, episode number, publishing date (when it was first released), genre, category type, video type (live or VOD), etc. In this example, each heartbeat (or at least some of the heartbeats) also includes an identifier (also referred to herein as a "publisher identifier," "provider identifier," or "customer identifier") that uniquely identifies Acme Streaming.

The heartbeat may also include various other types of information such as audience, device, and geography. The status information may also include a variety of telemetry data such as information that captures the quality of the user experience (e.g., video stream quality), and information pertaining to user behavior. Examples of quality metrics include: the length of time it takes for the episode to start playing, the number of buffering events (if any), the length of buffering events, and the number of frames per second rendered by the video player. Examples of user behavior include: starting and stopping playing a video or audio stream, seeking within the stream, switching the player to full screen mode, minimizing/restoring the player, a change in the volume level of the player, and clicking on an advertisement.

As described above, the heartbeats are sent to platform 110 on a recurring basis. For example, the heartbeats are sent in real-time, both when the user requests the video, and while the user is watching the video. In this example, a heartbeat that includes the video asset metadata about the episode that the user of client 102 is watching is provided to the metadata service platform. As shown in this example, the metadata for the episode, which was defined and reported by Acme Streaming service, has been provided to the metadata service platform indirectly via the client, when the video is streamed. By obtaining publisher-provided metadata via the client, Acme Streaming service does not need to expend effort to implement a separate mechanism by which to provide the video asset metadata to platform 110 (for example, if the monitoring library of the content player is an existing integration with the provider that allows performance data about the streaming of a content item to be provided to platform 110 for further processing, the existing monitoring library integration may be leveraged by the platform to obtain the content metadata to build the metadata services database described in further detail below).

As will be described in further detail below, the platform uses the provider-defined metadata received via the client to organically build and maintain its own database of metadata for video assets being viewed by end-users (e.g., user of client 102).

In this example, the heartbeat sent by the client that includes the video asset metadata is received by gateway 112 of platform 110 (where the gateway may be implemented, for example, as a HyperText Transfer Protocol (HTTP) gateway).

The heartbeat is then processed by Metadata Service Rules Engine 114. In this example, the metadata rules engine is configured with rules (e.g., Extract, Transform, Load (ETL) rules) to ingest customer tags (video asset metadata), analyze the data in the tags, and normalize the customer-provided metadata to output "clean" metadata that has been standardized according to a unified data model, where the normalized metadata will then be stored to metadata service database 124 of the platform. As shown in this example, platform 110 is processing the metadata as soon as it has received/ingested the metadata from the content player, which is being provided to the platform by the client in real-time, as the viewer is playing the content.

As shown in this example, and will be described in further detail below, different customers or entities (e.g., content publishers, distributors, etc.) that subscribe to the metadata service each have their own predefined set of metadata service ETL template rules. This is to deal with the issue of video asset metadata diversity and complexity that exists in streaming event data, where each customer may define and report the video attributes according to their own naming conventions, resulting in video asset metadata ambiguity and inconsistency across the various entities. Using the metadata service rules engine, regardless of how different customers define the metadata for a video asset, the rules will transform or normalize them into a standardized, canonical unified format maintained by the platform.

In this example, the customer identifier for Acme Streaming service included in the heartbeat is used to select an appropriate predefined set of ETL metadata service rules (116) usable to normalize the video asset metadata defined by Acme Streaming. The ETL rules include parsing rules and regular expressions usable to extract and transform the video asset metadata.

For illustrative purposes, suppose that in the metadata services database, series names and episode names are to be capitalized, where season number and episode number are stored as separate fields. In this example, suppose that the original values defined by Acme Streaming and received by the platform via the client are in the form:

"VOD|the_everything_show|nothing_at_all|S7:E18" horror.

After the parsing by the metadata ETL rules (examples of which are described in further detail below), the original values are transformed into the following:

{
   "seriesName": "The Everything Show",
   "assetName": "Nothing At All",
   "seasonNumber": 7,
   "episodeNumber": 18,
   "genrePrimary": Horror,
   "videoType": VOD
}

That is, in this example, the various video asset metadata values have been parsed, extracted, and normalized into a standardized/uniform format. As will be described in further detail below, regardless of how metadata is defined by different customers, the metadata service platform will normalize the metadata into a unified consistent format using the metadata service rules described herein. In various embodiments, normalizing includes performing capitalization, uppercase operations, lowercase operations, etc.

In some cases, the same customer will provide a metadata value under different tags (i.e., there is diversity in metadata definition even within the same customer). For example, for the same provider, metadata values may be defined differently due to different players with different SDKs and different integrations, or for different devices.

To address this issue of multiple tags providing the same type of data value, in one embodiment, the ETL template for the customer includes a prioritized list of tags to identify in the received metadata. For example, using the prioritization, the ETL rules check to see if there is data in the collected metadata under a first tag/field name, and if not, then checks for a next tag/field name in the priority list.

In some embodiments, the metadata service platform generates the ETL rules (or a model) for cleaning and extracting asset metadata for each customer, publisher, or provider by leveraging machine learning and other technologies. As one example, an artificial neural network is used to build a model to map a customer's input data (e.g., the output of per-publisher ETL rules) to the standardized/normalized metadata. In one embodiment, a training data set is setup (e.g., manually) with entry mappings between customer metadata and normalized metadata. A neural network model is trained on the training data set. The model analyzes and learns the potential mapping from the training data. After the model is trained on the training data, the model is applied to a customer's metadata to obtain standardized metadata. For example, for the example input data {"content type": "VOD", "channel": "ACME Streaming", "name": "The everything show—Nothing at all"}, the model will provide the output of: {"content type": "VOD", "channel": "ACME Streaming", "series name": "The Everything Show", "season number": 3, "episode number": 1, "episode name": "Nothing At All"}. Here, as shown in this example, the model has been trained to determine that the input of "The everything show—Nothing at all" represents the episode "Nothing At All" in the series "The Everything Show," and to generate normalized metadata accordingly (e.g., by parsing out the episode name in the input data into a separate episode name field, while parsing out the series name into a separate series name field, where both values are normalized (e.g., with respect to capitalization)).

After the normalized version of the customer-defined metadata received via the client content player is generated using the selected rule set pertaining to the customer, the normalized metadata is stored to metadata service database 124. The metadata service database is configured to maintain, for each content item for which metadata is received, a complete, unified set of metadata. As one example, the metadata service database is implemented using HBASE.

In this example, each content item has a corresponding unique record or entry in the metadata service database, where the record is used to store the normalized key-value pairs of video asset metadata. For example, even though multiple streaming services provide the episode of content, there exists only one record in the metadata services database used to store the metadata for the content episode. In one embodiment, entry update engine 120 is configured to identify the appropriate record mapping to the episode as follows. Alias generation engine 122 of entry update engine 120 is configured to use a portion or subset of the normalized video asset attributes to generate an alias or unique string that corresponds to the episode's record. Examples of video attributes designated for use in generating the alias include metadata that is likely to be defined by all customers. For example, for tv shows, the following four fields are used to generate an identifier of a show: season; series name; episode name; and season number. These fields are combined and transformed into an identifier (e.g., by performing a hash on the four fields). Different types of attributes (and their combinations) may be used to generate aliases/keys for different types of content. The use of aliases to identify existing records prevents duplication of content metadata in the database. In some embodiments, when customer tags are ingested by the metadata services platform, the alias generation is used to determine whether the data that has been received is new or has already been treated. As one example, this operation occurs in the ETL phase, where when applying an ETL rule, an alias is generated for an entry (for an asset). This alias should be unique in the metadata services database. The metadata services database is checked to determine whether an entry for the alias already exists. If so, then this entry has already been processed before. If not, then it is a new entry.

As described above, if there is no record/entry corresponding to the generated key, then this is an indication that the platform has not previously received metadata about the content from content players. In some embodiments, the platform dynamically generates the record in the metadata services database for the content item.

The record corresponding to the content item, identified using the generated alias, is then updated. In some embodiments, updating the entry using the normalized asset metadata includes populating any fields that are empty (i.e., for which there is not yet any information). In this example, suppose that the record in the database is in its initial state, and none of the fields in the database record for the episode of content have yet been populated.

The record is populated with the field values that are present in the received normalized video asset metadata. For example, suppose that the database record for the content includes the field series name, episode name, episode number, season number, genre, video type (e.g., live or video on demand (VOD)), and content length (e.g., in seconds or any other unit of time, as appropriate). Those fields in the database for which there are corresponding values in the normalized metadata are populated/overwritten with the corresponding values in the normalized video asset metadata. In this example, the series name, episode name, episode number, season number, genre, and video type fields in the metadata database record for the content are populated, while the content length field is not populated, because the heartbeat did not include a value for the length of the episode (that is, those fields for which the normalized video asset metadata does not have values are not populated).

In this example, the genre defined by Acme Streaming for the episode is "Horror," but suppose that this is incorrect, and the episode is actually a comedy. Despite the genre metadata received from client 102 being incorrect, because the metadata database record field for genre has not previously been populated, it is still populated, even with the incorrect value. As will be described in further detail below, validation is performed to correct any fields in the metadata services database with incorrect values that are errors.

In some embodiments, when a field in database 124 is populated or overwritten, additional information is recorded about the updating. For example, in various embodiments, a timestamp of when the metadata value was entered, a source of the value with which the field was populated (e.g., Acme Streaming in this example), etc. are recorded. In some embodiments, a count, indicating a number of times a field has been overwritten, is also updated/recorded. In this case, because the record for the episode was initially empty (and their overwrite counts were initialized, for example, to "0"), those fields that are now populated for the first time have their overwrite counts incremented to "1". As will be described in further detail below, the overwrite counts and timestamps may be used when validating and correcting field values.

In some embodiments, in addition to storing the normalized versions of the metadata defined by Acme Streaming, platform 110 also stores the original video asset metadata received via client 102 so that, for example, Acme Streaming may perform analytics using their originally defined metadata. In some embodiments, the metadata services database record for the asset also includes a link (e.g., uniform resource locator (URL) of an image for the asset e.g., by obtaining a URL from a third-party metadata catalog such as IMDB, Gracenote, Rovi, etc.). Saving a URL to the image rather than saving an actual image saves storage space. Thus, the metadata services database also provides a canonical location for image links for content items.

Now suppose that at a later time, after client 102 has begun streaming the episode of the series from Acme Streaming service and provided the metadata service platform with metadata for the asset, a user of another client, client 126, also requests to watch the same episode of the same series, but through another streaming service, Beta Streaming 132, which also carries the episode. In this example, similarly to client 102, client 126 includes a content player application 128 which in turn incorporates a monitoring module 130. Content is received (e.g., over a network such as the Internet) by player 128 from Beta Streaming (which is also a customer or entity that utilizes the metadata services provided by metadata service platform 110). Monitoring Module 130, similar to monitoring module 106, collects status information about the streaming session (including video asset metadata defined by Beta Streaming and provided to the content player 128), and then communicates the status information (e.g., in the form of recurring heartbeats) to metadata service platform 110.

In this example, suppose that client 126 provides the following video asset metadata for the same episode of content, where the metadata defined by Beta Streaming and the format of the metadata from Beta Streaming are different from what is provided by Acme Streaming. For example, suppose that the metadata provided via client 126 includes the following fields in the following format:

"The Everything Show—S7:E18—Nothing At All—comedy—1800.

Compared to the video asset metadata received from client 102 streaming from Acme Streaming, the video asset metadata defined by Beta Streaming has the same series name, episode name, season number, and episode number. However, while the Acme Streaming series and episode names were lower case with underscores between words, the Beta Streaming provided metadata is defined differently, with capitalized first letters and spaces, instead of underscores. The Beta Streaming defined asset metadata also includes the correct genre (as compared to the incorrect genre provided by Acme Streaming). Further, as shown in this example, compared to Acme Streaming, Beta Streaming has not defined a video type (live or VOD) metadata value for the asset (which Acme Streaming did provide), but does include an indication of the length of the content item in seconds (which Acme Streaming did not provide). Thus, as shown in this example, even though both Acme Streaming and Beta Streaming carry the same content asset, the metadata that they have defined is inconsistent, with gaps and errors.

The Beta Streaming-defined video asset metadata received via client 126 is then parsed and normalized using an appropriate set of metadata service rules in metadata service rules engine 114. For example, similar to as described above, the heartbeat from client content player 128 including the video asset metadata includes an identifier for Beta Streaming. The identifier for Beta Streaming is used to select, from multiple rule sets corresponding to different customers, Beta Streaming metadata service rules 118. The selected predefined rules 118 are then used to extract, parse, and normalize the video asset metadata received from client 126. After the parsing by the selected metadata ETL rules, the original values are transformed into the following:

```
{
    "seriesName": "The Everything Show",
    "assetName": "Nothing At All",
    "seasonNumber": 7,
    "episodeNumber": 18,
    "genrePrimary": Comedy,
    "contentLengthSec": 1800
}
```

As shown in this example, despite the format of the metadata from clients 102 and 126 being different (e.g., with different capitalizations, naming conventions, etc.), the video asset metadata is normalized into a standard form for storage in the metadata services database 124.

The normalized video asset metadata generated from the status information received from client 126 is then used to update the entry for the episode asset in metadata service database 124.

For example, as described above, the same attributes (seriesName, assetName, seasonNumber, and episodeNumber) are used to generate an alias or identifier of the asset whose metadata fields are to be updated. Based on these example attributes, the same record as previously accessed in the metadata service database is identified.

The normalized video asset metadata generated from the status information received from client 126 is then used to fill in or populate any fields in the database 124 asset record that are missing or empty. For example, the content length field (in seconds, or any other unit of time, as appropriate) in the database record is populated with 1800 (indicating that the length of the episode is 1800 seconds). Similarly to as described above, in some embodiments, the time at which the content length field was populated/overwritten is recorded, as well as the source of the field value, which for the content length field is Beta Streaming. In this example, the count of the content length field is also incremented to "1" from zero, as it is the first time the field is being overwritten.

Fields in the database record whose values have already been populated are not overwritten. For example, series name, asset name, season number, and episode number, having previously been populated with the normalized version of the values defined by Acme Streaming service, are not overwritten with the Beta Streaming-defined values, and their overwrite counts ("1"), sources ("Acme Streaming"), and timestamps remain the same. This includes the genre, which is not overwritten, even though Beta Streaming has the correct value. As will be described in further detail below, validation will be performed on the metadata service database to correct any incorrect values.

Thus, the asset's metadata record maintained in the metadata services database is organically populated with normalized versions of metadata values as they are received from clients, in real-time, when the asset is being streamed, where the metadata record may be populated with normalized versions of values from multiple sources or entities. Thus, the metadata store includes a superset of metadata that may exceed what a provider has individually defined for the content they carry. By generating a metadata store using metadata from multiple providers, gaps in individual provider's metadata may be filled with metadata from other providers that have that metadata (e.g., one provider's metadata may be used to augment metadata provided by a different provider).

As described above, the values stored in the metadata services database 124 include normalized versions of values that are defined by various sources/providers, where the first value that is received, regardless of which entity it is defined by, is used to populate a corresponding field. However, as shown in this example, the values that are stored may be incorrect (e.g., such as the incorrect genre value of "Horror" defined by Acme Streaming that was stored to the asset's record in the metadata services database).

As will be described in further detail below, asset metadata validation engine 142 is configured to validate the metadata stored to and maintained by metadata services database 124. The validation includes monitoring the metadata values that are written to the metadata services database, and correcting any errors that exist in the metadata services database.

In some embodiments, hierarchical or tiered validation is performed, where, for example, a first automated validation job is performed to validate the metadata values received via clients such as clients 102 and 126, where the first automated validation job is then followed by a second validation job, which validates the results of, or changes made by, the first automated validation job. As will be described in further detail below, the second validation job includes presenting the results of the first automated validation job to administrators, testers, or validators for review and validation.

As described above, when a metadata value is written to the record for an asset in the metadata services database, a timestamp of when the metadata value was written and the source of the metadata value are recorded. A count indicating a number of times that the corresponding field has been overwritten is also incremented.

In this example, third party metadata validation engine 136 is a backend job that checks the metadata written to database 124 daily (or on any other appropriate recurring or time driven basis), and automatically compares the daily written metadata to metadata from a third party source, such as third party metadata catalogs 138 and 140, which may include catalogs such as IMDB, Gracenote, Rovi, etc.

For example, using the recorded timestamps and counts, third party metadata validation engine 136 obtains, extracts, or otherwise accesses the metadata for fields that were overwritten within the last 24 hours and that have a count of "1" (which indicates that the fields were overwritten for the first time using metadata received from client content players).

The obtained metadata values are then compared against metadata from a third party source such as metadata catalogs 138 and 140.

One example of the processing performed by the automated backend job performed by third party metadata validation engine 136 is as follows. The backend job includes a mapping between fields of the third-party catalog and fields of the metadata services database. When validating a metadata value for a field in database 124, the backend job uses the mapping to obtain the third party catalog-defined value for the field. The backend job then compares the third party catalog-defined value with the value stored in the metadata services database. If the values match, then the backend job determines that the existing value written to the database is correct (according to the third party metadata catalog, which, in this example, has a higher level metadata authority relative to the metadata defined by the customers and received via the client). If, however, the values do not match, then the existing value in database 124 is overwritten with the third party catalog-defined value. If overwriting of the value of a field is performed, the timestamp of the overwriting is recorded, the source of the new metadata value is indicated by the third party metadata catalog, and the count of the number of times the field has been overwritten is also incremented. For example, consider the genre field for the asset, which, prior to the automated validation job, has, in the metadata services database, the incorrect value of "Horror," a timestamp of when the "Horror" value was written, has the source indicated as "Acme Streaming," and has an overwrite count of "1". Suppose that third-party metadata catalog 138 has the correct genre value of "Comedy". The automated job rewrites the genre field value with "Comedy," updates the timestamp of the new write, changes the source of the value to "Metadata Catalog 1" (the source of the correction), and increments the overwrite count from "1" to "2". The change of the overwrite count indicates that the field has gone through at least one round of validation.

Multiple third-party metadata catalog may be used to validate the metadata stored to the metadata services database. For example, if IMDB does not have metadata for a field in the metadata services database, another third-party catalog may be accessed to obtain metadata by which to validate a value stored in the metadata services database. In some embodiments, the set of third-party metadata catalogs used by the validation engine is prioritized (e.g., with IMDB used first, then Gracenote, etc.).

In some embodiments, third party metadata validation engine 136 is implemented using Apache Spark, and may include machine learning jobs and algorithms that are applied to the metadata in database 124 to correct any issues. In some embodiments, a set of offline machine learning models is used to perform deduplication and precisely correct errors that exist in the metadata services database. For example, normalized metadata may come from various third party sources such as IMDB, Rovi, Gracenote, etc. However, the same asset may have different information on the different sources, causing the same asset to have multiple records in the metadata services database (when there should only be one unique record for the asset in the metadata services database). In some embodiments, a model for performing deduplication is used, where the model calculates the similarity between two assets, and if the similarity is greater than a threshold, then the two records are considered as pertaining to the same asset, and one of the duplicate records is removed.

In the above example, the third party metadata validation engine was run on a daily basis to check metadata values that were written during the previous day. In some embodiments, the automated validation job may be performed over the entire database to correct the entire metadata services database.

In the above example, provider-defined metadata received via client content players was validated using metadata from third party metadata catalogs. In some embodiments, the integration with third party metadata catalogs may be used to fill in metadata for content that has not yet been watched (and thus, metadata has not yet been received from clients).

In this example, asset metadata validation engine 142 also includes administrator management system 134. In some embodiments, administrator management system 134 is configured to facilitate validation of the results of (e.g., the changes made by) the automated validation job performed by third party metadata validation engine 136. This is, for example, to account for any errors with sources such as third party metadata catalogs, where incorrect values in the third-party metadata catalogs may be automatically written to the metadata services database during the automated validation job. The management system allows testers or validators to automatically correct any incorrect values stored in the metadata services database. In this example, the administrators have a higher level of metadata authority than the third party catalogs with respect to metadata validation.

As one example, a human administrator or validator is presented a graphical user interface (GUI) of the list of metadata in the metadata services database 124 to be reviewed (where the management UI may be supported via an application programming interface (API) to the metadata services database). The list may also be presented in the form of a file (e.g., a spreadsheet). The list may include metadata that has been written in the last day (e.g., based on the timestamps recorded when the metadata is written to database 124). In some embodiments, the list of metadata values is prioritized by overwrite count. For example, those metadata values with higher overwrite accounts are presented above or before metadata values with lower overwrite accounts. In this way, for example, values such as the genre field for the episode of content, which was overwritten by the third party validation engine and has a value of "2," are prioritized ahead of other values which have not yet been validated by the third party validation engine, or were validated by the automatic job, but not overwritten (because there was determined to be a match between the metadata received from the client and the metadata from the third-party catalog).

The validator or administrator is able to review the overwritten fields and determine if they are correct or should be changed. If the validator determines that a metadata value is correct and does not change the field value, then no changes are made to the metadata field value (e.g., the overwrite count and source remain the same). If the validator determines that a metadata value is incorrect and changes the field value, then a timestamp of the change made by the validator is recorded, the source of the change is indicated as the validator (e.g., by designating the source as "administrator" to indicate that the field has also undergone human review), and the overwrite count is incremented.

In some embodiments, if the validator changes the value, then the updated field in the metadata services database 124 is locked from further editing/updating, and the system ignores further edits (e.g., if the automated validation job is run again on the entire database). However, other human reviewers may be allowed to change locked values.

In some embodiments, the metadata services platform maintains an audit or change log of the history for each field, recording the history of overwrites to the field in database 124.

The metadata service database 124, whose values have been organically collected and undergone validation, as described above, may be used to power and provide or support various services to the disparate customers using the complete and unified metadata. Thus, all customers (e.g., Acme Streaming and Beta Streaming) have access to complete and correct metadata, regardless if the data the customers defined for themselves had gaps or incorrect values. Further, as the metadata for an asset is processed in real-time, as clients watch the content, the customers will have the "cleaned" (i.e., complete, correct, and standardized) metadata available to perform analytics on the content when people stream the content. This is an improvement over relying on existing third party metadata catalogs, which are often slow and lag behind in providing metadata for content (e.g., the metadata for the content is not ready on the third party metadata catalog until long after viewers have started watching the content). Using the techniques described herein, real-time analytics of content, as it is being streamed, is facilitated.

In one embodiment, metadata services API 144 is used to support metrics, dashboards, applications (146), etc. that leverage the normalized and validated metadata in metadata services database 124 to allow customers of the metadata service to analyze, gain insight, and promote their content. For example, a dashboard may call the API using the content name, where the API returns, from the metadata services database, the metadata for the content with that name.

As one example, Acme Streaming previously did not have metadata about the content length of the episode "Nothing At All." However, by leveraging metadata defined by Beta Streaming service (and received via client player 126), Acme Streaming can now gain insights into how the episode performed on its streaming service based on content length, such as viewership metrics (which are defined based on content length), that it could not previously view when using only its own defined metadata. Similarly, Beta Streaming, which did not define video type (live or VOD), can now segment its information according to video type, which it could not do previously.

Further, because the genre category had been erroneous and is now correct, Acme Streaming, when, for example, segmenting quality of experience of assets in the comedy genre, will have the performance of the episode factored into the results, whereas, previously, due to the incorrect genre designation, the episode's performance would have not been considered (or would have been incorrectly included in results for the horror genre).

Thus, by filling in gaps and correcting errors in metadata, entities utilizing the services of the metadata services platform described herein may gain additional insights into their content that they could not previously. Further, the techniques described herein allow retroactive insights into content analytics, as the metadata completion and validation can be performed for content for which performance data was previously collected.

As described above, in some embodiments, in addition to maintaining a unified set of normalized metadata that is accessible to all customers of the platform, the original metadata defined by each customer is also maintained. In this way, via a user interface or dashboard, the customer can also view the metadata they had originally defined for the content items.

Figure 2A:
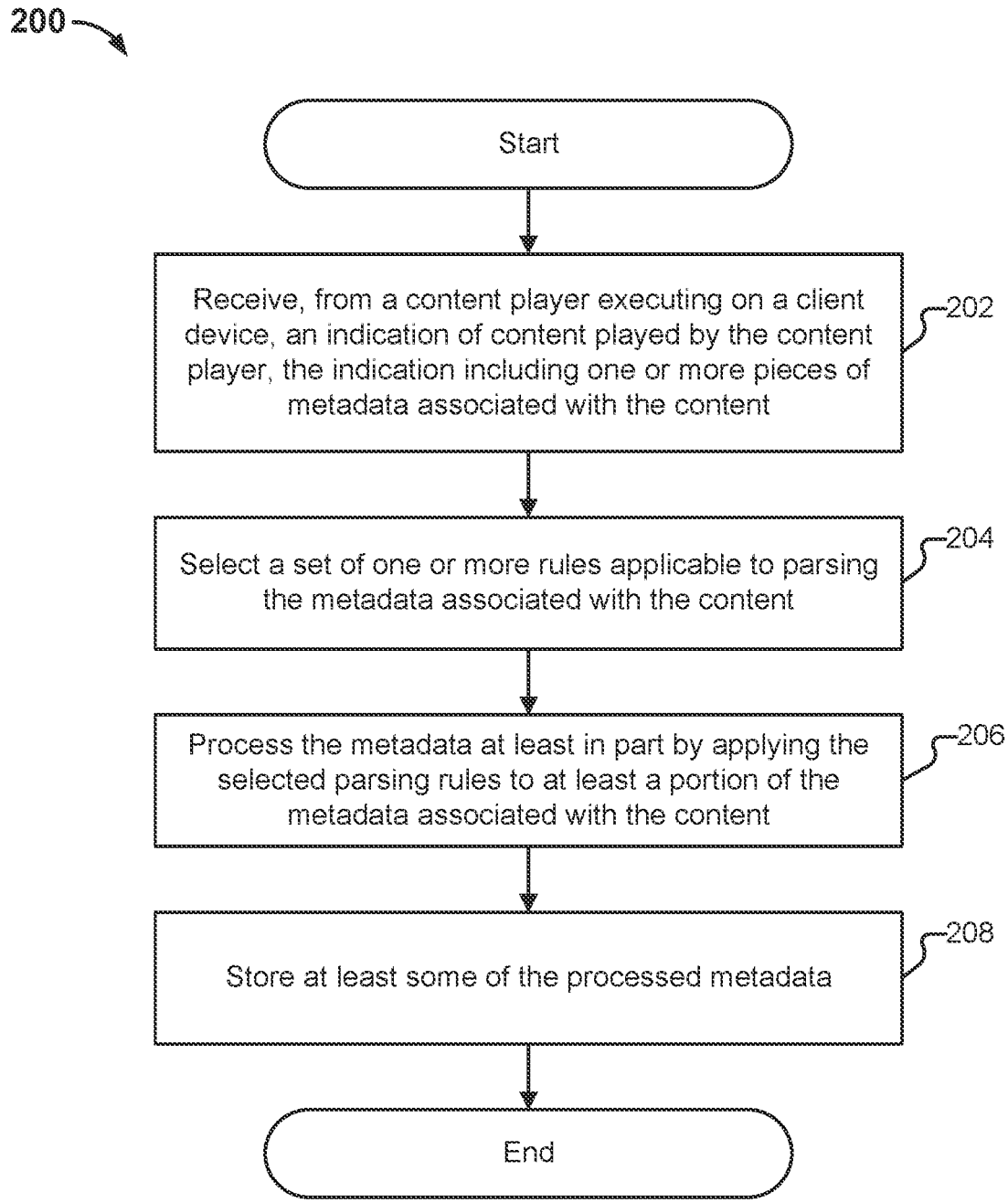
FIG. 2A is a flow diagram illustrating an embodiment of a process for establishing a data store of content metadata.

FIG. 2A is a flow diagram illustrating an embodiment of a process for establishing a data store of content metadata. In some embodiments, process 200 is executed by platform 110 of FIG. 1. The process begins at 202 when an indication of content played by a content player executing on a client device is received from the content player. The indication includes one or more pieces of metadata associated with the content. In various embodiments, examples of the pieces of metadata associated with the content that are received from the client device include country, description, title, season number, series name, episode number, genre, publishing date, content type, video type (e.g., live or video on demand), list of actors and actresses, list of awards, image URLs, etc. In some embodiments, these metadata values are defined by an entity such as a provider of the content (e.g., content streaming service, content distributor, content publisher, etc.) but are received via the content players playing the content. As described above, the metadata from the content player may be received in the form of heartbeats.

At 204, a set of one or more rules applicable to parsing the metadata is selected. In some embodiments, the set of parsing rules is selected based on an identifier of a provider of the content. The set of rules may be selected from multiple sets of rules, where different content providers each have their own corresponding set of predefined parsing rules.

At 206, the received metadata is processed at least in part by applying a portion of the selected set of parsing rules to at least a portion of the metadata. In some embodiments, applying the set of parsing rules includes extracting the metadata and normalizing the extracted metadata from the content player to a standard format. In various embodiments, normalizing includes performing capitalization, uppercase operations, lowercase operations, etc.

At 208, at least some of the processed metadata associated with the content is stored. For example, the processed metadata is stored to a record in a data store, where the record corresponds to the content, and where the record includes the normalized metadata about the content. In some embodiments, storing the processed (and normalized metadata) includes generating an alias, where the alias is used to identify the record in the data store. For example, the alias is generated using a portion of the pieces of metadata designated for generating the alias. As one example, a hash is generated using the pieces of metadata designated for generating the alias, and the record for the content is identified using the hash. The processed metadata is then stored to the record corresponding to the hash/alias.

Figure 2B:
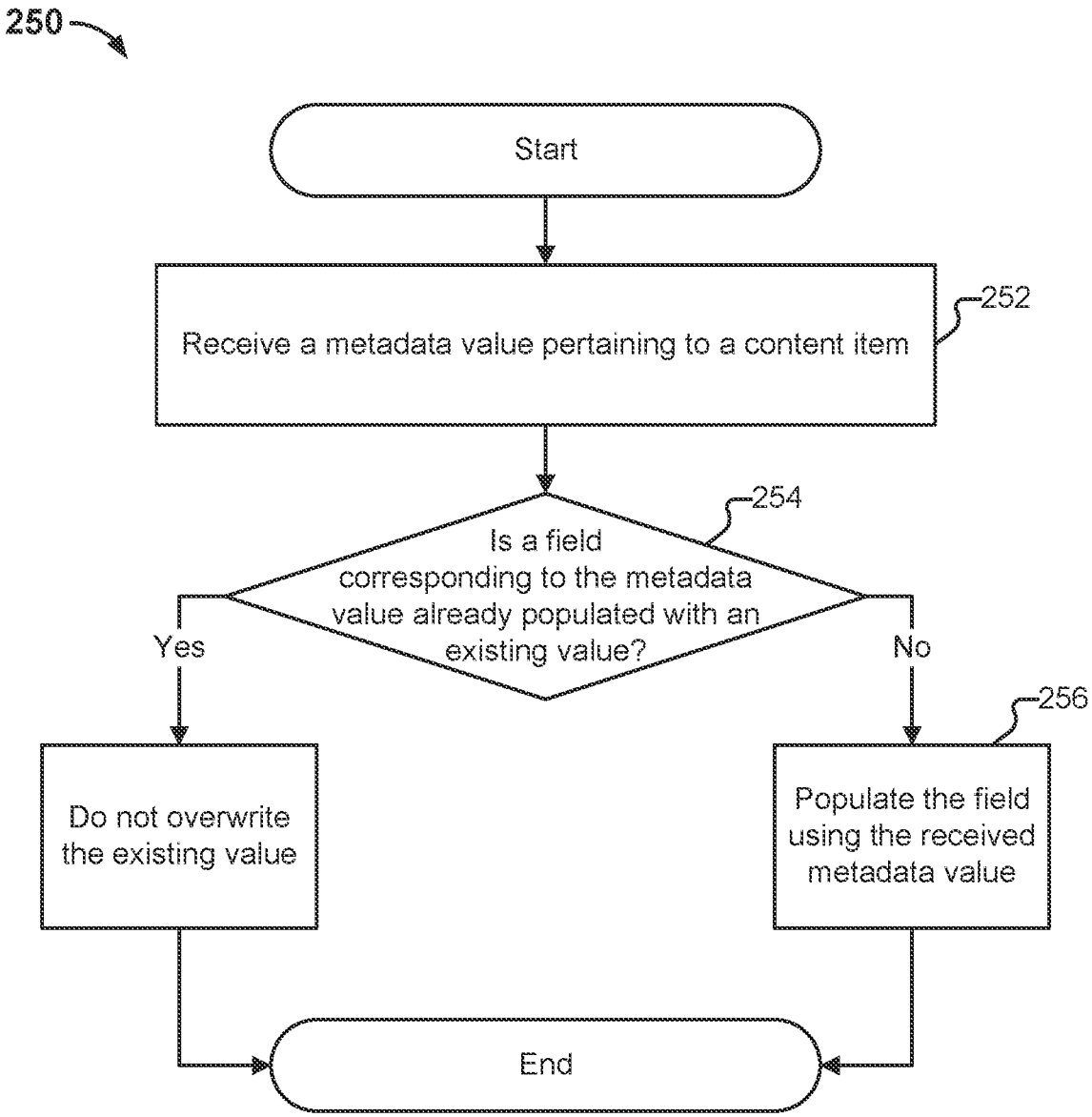
FIG. 2B is a flow diagram illustrating an embodiment of a process for augmenting content metadata.

FIG. 2B is a flow diagram illustrating an embodiment of a process for augmenting content metadata. In some embodiments, process 250 is used to execute a portion of step 208 of process 200 of FIG. 2A. The process begins at 252 when metadata associated with content played by a content player is received. This may include normalized metadata generated using process 200 of FIG. 2A (e.g., using process step 206).

At 254, it is determined whether a field corresponding to a piece of metadata in the metadata received at 252 is already populated. For example, it may be the case that a field in the record for the content has already been populated with a normalized version of metadata previously received from another content player.

If, at 254, it is determined that the field is not already populated with an existing metadata value, then at 256, the field is populated using the metadata value received at 252. In some embodiments, when the field is populated, a timestamp of when the overwriting was performed is recorded. Further, a source of the metadata (e.g., the name of the provider that defined the metadata) is recorded. A count indicating a number of times that the field has been overwritten is also incremented. If, at 254, it is determined that the field is already populated with an existing metadata value, then the existing value is not overwritten, and the process ends.

Figure 3A:
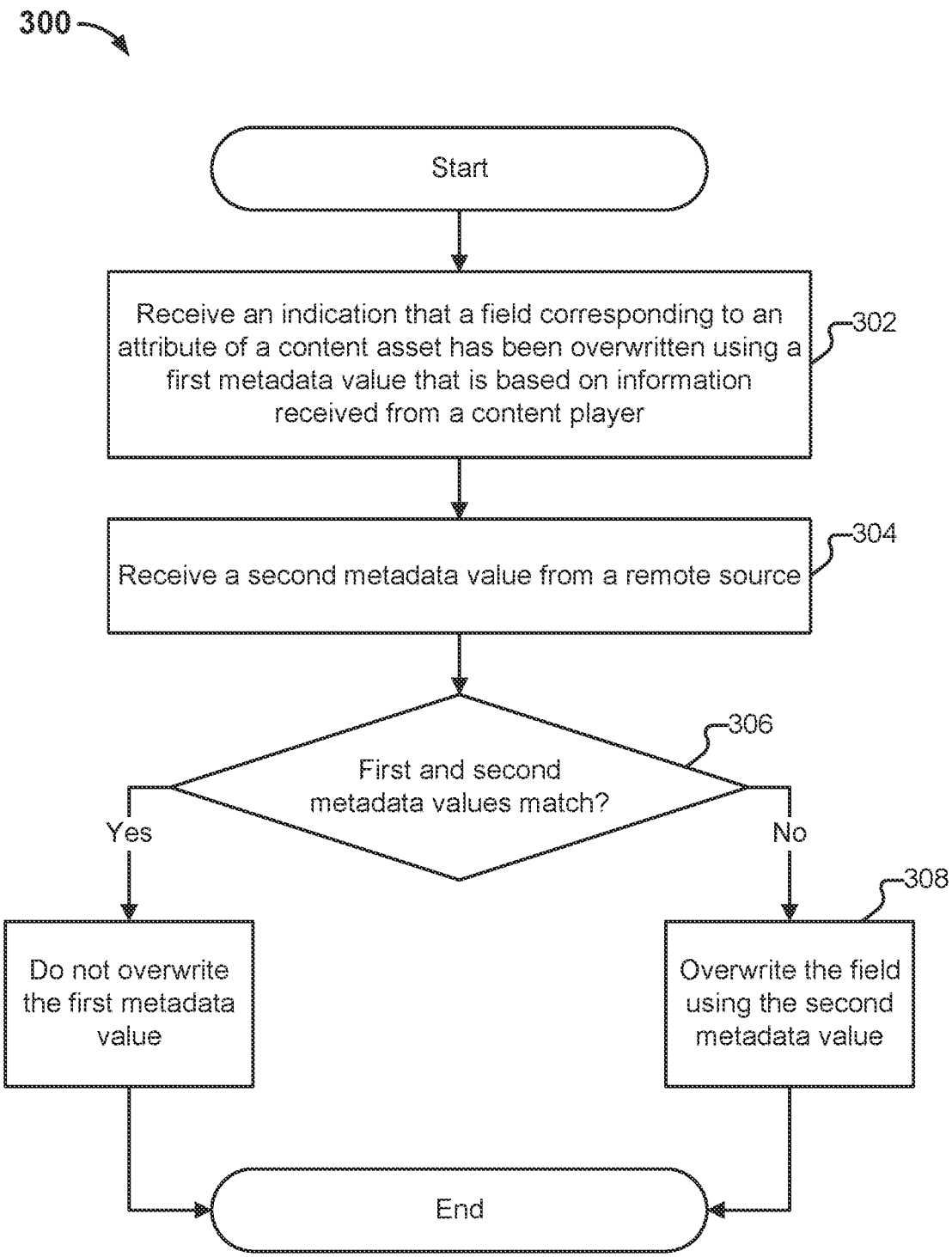
FIG. 3A is a flow diagram illustrating an embodiment of a process for automated validation of content metadata.

FIG. 3A is a flow diagram illustrating an embodiment of a process for automated validation of content metadata. In some embodiments, process 300 is executed by third party metadata validation engine 136 of platform 110 of FIG. 1. The process begins at 302 when an indication is received that a field (e.g., in metadata services database 124) corresponding to an attribute of a content asset has been overwritten by a first metadata value. For example, an indication that the field has been overwritten using a normalized version of metadata received from a content player (e.g., generated and stored using processes 200 and 250) is received. A list of metadata fields that have been overwritten may be received. In one embodiment, the fields are included in the list based on their associated overwrite count. For example, those fields whose overwrite counts are greater than zero (e.g., "1" after having been overwritten the first time using the metadata defined by a provider such as a streaming service) are received for validation. In some embodiments, the processing is performed as a job on a recurring basis, and metadata fields that have been overwritten since the last validation job (identified, for example, based on the timestamps of when they were overwritten and/or their overwrite counts) are received for validation.

At 304, a second metadata value from a remote source is received. As one example, the second metadata value is a value for the field received from a third party metadata catalog such as IMDB, Rovi, Gracenote, etc.

At 306, it is determined whether the first metadata value and the second metadata value match. If the metadata values match, then the first metadata value is determined to be correct, and the process then ends. If the metadata values are determined to not match, then the process continues to 308, where the field is overwritten using the second metadata value. In some embodiments, overwriting the field includes recording a timestamp, recording a source of the second metadata value (e.g., the name of the third-party metadata catalog), and incrementing an overwrite count associated with the field.

Figure 3B:
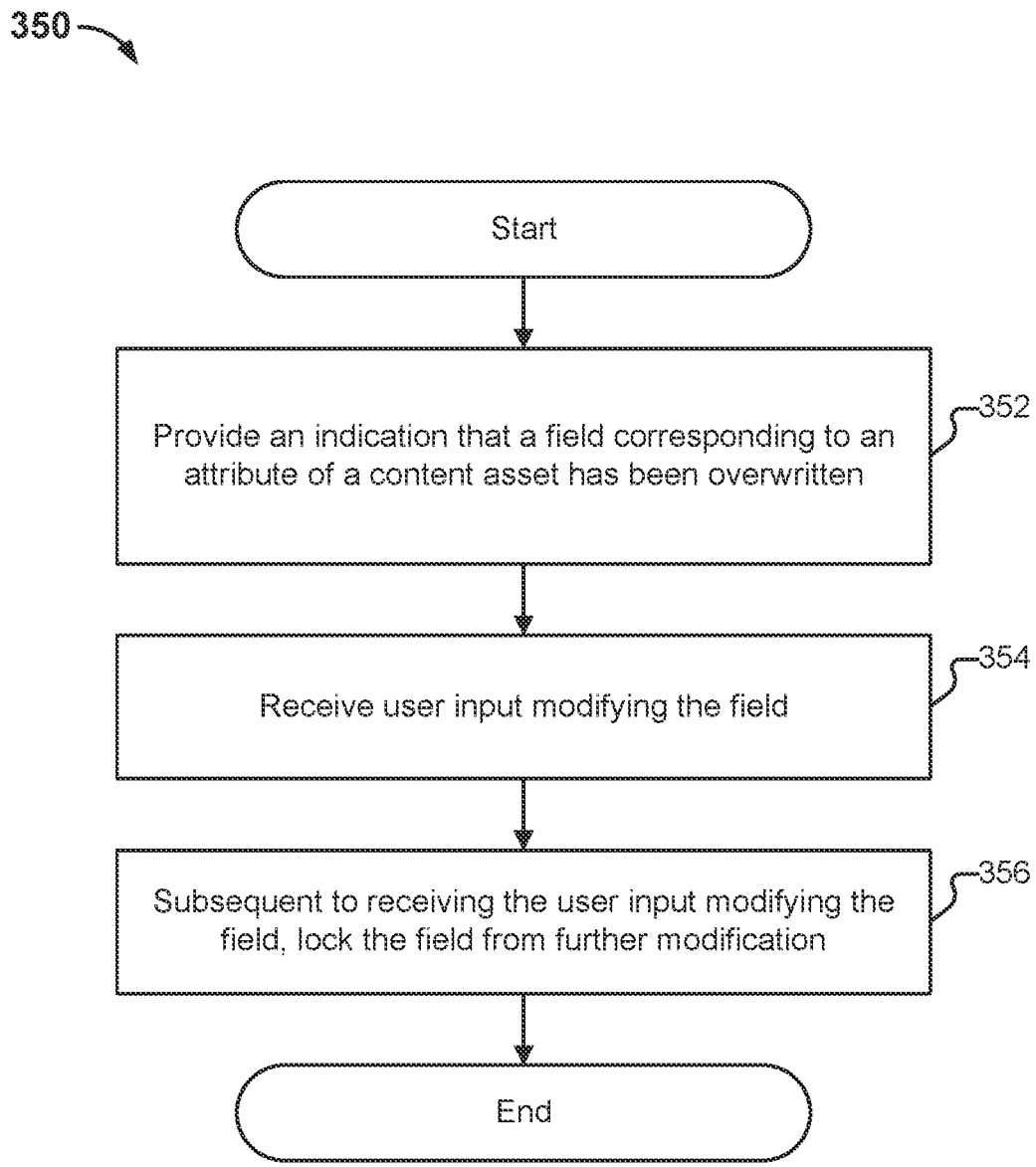
FIG. 3B is a flow diagram illustrating an embodiment of a process for facilitating administrator validation of content metadata.

FIG. 3B is a flow diagram illustrating an embodiment of a process for facilitating administrator validation of content metadata. In some embodiments, process 350 is executed by administrator management system 134 of platform 110 of FIG. 1. The process begins at 352 when an indication is provided of a metadata field corresponding to an attribute of a content asset has been overwritten. As one example, a list of fields that have been corrected as part of the validation processing performed using process 300 are provided to an administrator for review (e.g., through a graphical user interface, a file, etc.). In some embodiments, the administrator-validation may be facilitated on a recurring basis, and metadata fields that have been overwritten since the last administrator validation (identified, for example, based on the timestamps of when they were overwritten and/or their overwrite counts) are provided for administrator validation. The provided list of overwritten fields to be reviewed by an administrator may include both values that have already undergone automated validation and been corrected, as well as values that have been written for the first time (e.g., using normalized versions of metadata values received via client players, as described in conjunction with processes 200 and 250 of FIGS. 2A and 2B, respectively). In some embodiments, the list of overwritten fields to be reviewed by an administrator are prioritized by overwrite count. This allows, for example, those values that were corrected by automated validation to be prioritized (e.g., ahead of values that have yet to be automatically validated) and brought to the attention of the administrator for review.

At 354, user input modifying the field is received. For example, suppose that the administrator determines that the existing metadata value for the field is incorrect and overwrites the existing value with a new metadata value. In various embodiments, a timestamp of the administrator overwrite is recorded. The source of the overwrite (e.g., the administrator) may also be recorded. The overwrite count of the field may also be incremented.

At 356, based on the modification of the field by the user, the field is locked from further modification.

Thus, using the techniques described herein, a set of complete, validated, and standardized content may be generated and maintained by leveraging metadata defined by many entities, to overcome gaps and errors in individual entity's metadata. Further, the unified set of metadata is generated organically, using raw metadata collected from clients as they stream content (e.g., as part of monitoring the content), such that entities such as content publishers and distributors do not need to spend additional effort in providing asset metadata to the metadata service platform.

Example Transformation Rules

The following is a list of names for asset fields stored in the metadata services database for a content asset:

```
"assetFields": [
  "tmsId",
  "countryCode",
  "genreList",
  "genrePrimary",
  "categoryType",
  "contentType",
  "name",
  "originalName",
  "description",
  "imageUrl16x9",
  "imageUrl4x3",
  "contentLengthSec",
  "seasonPremiere",
  "seasonNumber",
  "seriesName",
  "seriesPremiere",
  "showTitle",
  "episodeNumber",
  "actorsList",
  "awardsList"
],
```

The following is an example of transformation functions for normalizing metadata collected from content players.

```
"transformFunctions": ["capitalize", "uppercase", "lowercase"]
```
The following is an example of supported sources:
```
"supportSources": [
  "conviva"
],
```

FIGS. 4A-4C illustrate embodiments of metadata extraction rules for processing various types of heartbeat objects received from the client content players and ingested by platform 110. The logic shown in FIGS. 4A-4C includes regular expressions for parsing/extracting metadata values from certain types of objects, as well as mappings of the extracted values to asset fields, such as those described above. In some embodiments, the logic shown in the examples of FIGS. 4A-4C is maintained and executed by metadata service rules engine 114.

FIG. 4A illustrates an embodiment of predefined metadata parsing and mapping rules. In this example, a set of predefined metadata parsing and mapping rules for Acme Streaming service objects (e.g., heartbeats) is shown. The type of the object is specified at 402 ("AcmeObjectId"). A set of regular expressions used to parse/extract metadata values from heartbeats of the type "AcmeObjectId" is shown at 404. At 406 are shown mappings of the extracted metadata values to asset fields, such as those shown above. As will be described in further detail below, the regular expressions and group mappings will be used to parse/extract data from heartbeats as part of a set of metadata processing logic when ingesting the heartbeats received from client content players.

FIG. 4B illustrates an embodiment of predefined metadata extraction and mapping rules. Shown in the example of FIG. 4B is parsing and mapping logic for processing heartbeats of the type "GammaObjectId" (422). Regular expressions for parsing and extracting metadata values from objects of type "GammaObjectId" are shown at 424. Example group mappings of the extracted metadata values to asset fields are shown at 426.

FIG. 4C illustrates an embodiment of predefined metadata extraction and mapping rules. Shown in the example of FIG. 4C is parsing and mapping logic for processing heartbeats of the type "BetaObjectId" (442). Regular expressions for parsing and extracting metadata values from objects of type "BetaObjectId" are shown at 444. Example group mappings of the extracted metadata values to asset fields are shown at 446.

FIGS. 5A-5C illustrate embodiments of logic for processing metadata (customer tags) for various customers or entities utilizing the metadata services provided by platform 110. In some embodiments, as described above, each customer may have a corresponding set of predefined metadata processing rules. When a heartbeat is received, the appropriate set of predefined metadata processing rules is selected for processing the metadata in the heartbeat. In some embodiments, the logic shown in the examples of FIGS. 5A-5C is maintained and executed by metadata service rules engine 114.

FIG. 5A illustrates an embodiment of logic for processing metadata for an entity. Shown in this example are metadata processing rules for processing the metadata provided by a customer identified by unique customer identifier 502. A source of the metadata (heartbeat) is indicated at 504. A brand associated with the received heartbeat is shown at 506 (where a single customer may have many sub-brands—e.g., Acme Streaming may have sub-channels for Acme Sports, Acme Drama, Acme Comedy, etc.). In some embodiments, the customer identifier, source, and/or brand is used to identify the set of rules as appropriate to process heartbeats with matching customer identifier, source, and/or brand. For example, the metadata processing rules of FIG. 5A are selected for processing heartbeats that include matching customer identifier, source, and/or brand attributes.

After selection/identification of the appropriate metadata processing rules, metadata values are extracted from the heartbeat using the extraction rules 508 of the metadata processing rules. As shown in this example, the extraction rules include a specification of predefined extraction and mapping rules for a given type of object (specified in this example at 510), such as those described above and in conjunction with FIGS. 4A-4C. For example, metadata is extracted using the specified extraction rules, and then mapped to asset fields using group mappings using the extraction and mapping rules of FIG. 4A for the object of type "AcmeObjectId". Direct customer tags may also be accessed to obtain metadata values that are mapped to asset fields. Also shown in this example are field priorities 512. Also shown are operations to reassign field values to other fields 514. Shown at 516 are the designations of what asset fields (e.g., after performing normalization by applying the specified metadata extraction and mapping rules) to use to generate the alias to identify a record in the metadata services database, as described above.

FIG. 5B illustrates an embodiment of logic for processing metadata for an entity. In this example, suppose that Acme Streaming has sub-brands AcmePlus (as shown in FIG. 5A) and AcmeDrama. As shown in this example, despite having a different customer number and brand than that specified in FIG. 5A, the same object type "AcmeObjectId" (522) is specified to process heartbeats for shows watched under AcmeDrama. That is, the same extraction and mapping rules shown in FIG. 4A used to parse heartbeats for shows watched under AcmePlus are used to parse heartbeats for shows watched under AcmeDrama.

FIG. 5C illustrates an embodiment of logic for processing metadata for an entity. Shown in this example are metadata processing rules for processing heartbeats for Beta Streaming service. The set of rules shown in FIG. 5C is selected and used to process heartbeats with customer identifier, source, and/or brand matching to attributes 542. As shown in this example, the same set of normalized asset fields (544) is used to generate an alias as in the examples of FIGS. 5A and 5B. Thus, if the same episode of the same show is watched by viewers on AcmePlus and Beta Streaming, the same metadata record in the metadata services database would be identified and updated.

An asset metadata service has been described. The metadata service provides a real time solution to deal with video asset metadata diversity and complexity. For example, as described above, while providers such as streaming services, content publishers, distributors, etc. may define their own metadata for the content they are providing, the metadata may be inconsistent, with gaps and errors. In existing systems, a content provider would only be able to understand the performance of their content in relation to their own defined metadata. This limits the ability of the provider to understand the performance of their content. For example, if a provider's metadata has a gap with respect to an attribute, then they will be unable to analyze content performance with respect to the dimension that they do not have defined for the content asset. Further, the provider would be unable to generate metrics that would rely on such dimensions. Further, if the provider has incorrect metadata defined for their content, this will lead to incorrect analysis of content performance. Additionally, even if the provider were to leverage the services of existing third-party metadata catalogs, such existing third-party metadata catalogs are often slow to update the metadata they have, and thus, providers would be unable to evaluate the performance of their content until long after viewers have already been watching the content. Further, this would require the providers to expend effort and resources in integrating the metadata from the existing third party catalogs.

The techniques described herein may be utilized to address such issues with metadata diversity and complexity. For example, to address the issue of gaps in an individual content provider's metadata, the techniques described herein allow a data store of content metadata to be organically created by leveraging and using metadata from many providers, where the collected metadata from multiple providers augment each other to fill in any gaps that exist in the metadata of individual providers. Further, errors in metadata may be corrected using the automated and administrator-based validation techniques described herein. Additionally, to address the issue in the lag of existing metadata catalogs in creating metadata for a content item, using the techniques described herein, a metadata data store is organically generated in near real-time as viewers are watching content (as, for example, the metadata used to build the metadata data store is collected from the content player when the viewer streams content). Because the metadata service platform receives metadata for a content item whenever it is being played by a content player, the platform begins processing metadata for the content from the first time that the content is streamed. This further allows providers to analyze how content is being streamed immediately as viewers start watching the item. Further, the effort required by providers to provide such metadata to the metadata services platform described herein is minimized, as the metadata, in some embodiments, is collected indirectly, via content players, where the content players may include integrated monitoring libraries that are leveraged to pass the provider-defined metadata to the metadata services platform along with performance data collected about streaming sessions played by the content player (and thus, a separate channel by which to pass metadata between the content provider and the metadata service platform need not be implemented). Thus, using the techniques described herein, the aforementioned issues may be addressed, where clean, consistent, complete, and standardized metadata is generated and may be used by other applications for online and/or offline uses to gain improved insights into streaming of content.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, from a content player executing on a client device, an indication of content played by the content player, the indication comprising one or more pieces of metadata associated with the content;
select a set of one or more rules applicable to parsing the metadata associated with the content;

process the metadata at least in part by applying the selected set of one or more parsing rules to at least a portion of the metadata associated with the content;

overwrite a field corresponding to an attribute of a content asset using at least some of the processed metadata associated with the content; and in response to receiving an indication of the overwriting, validate the at least some of the processed metadata used to overwrite the field; and a memory coupled to the processor and configured to provide the processor with instructions.

2. The system recited in claim 1, wherein the processor is further configured to record a timestamp corresponding to the overwriting.

3. The system recited in claim 1, wherein the processor is further configured to record a source of the at least some of the processed metadata used to overwrite the field.

4. The system recited in claim 1, wherein the processor is further configured to, based at least in part on the overwriting, increment a count of a number of times that the field has been overwritten.

5. The system recited in claim 1, wherein the validating comprises comparing the at least some of the processed metadata with metadata provided by a third-party source.

6. The system recited in claim 5, wherein the processor is further configured to perform a second overwriting of the field in response to determining that the at least some of the processed metadata does not match to a piece of metadata provided by the third-party source, wherein the field is overwritten with the piece of metadata provided by the third-party source.

7. The system recited in claim 6, wherein the processor is further configured to validate the second overwriting of the field with the piece of metadata provided by the third-party source.

8. The system recited in claim 7, wherein validating the second overwriting of the field with the piece of metadata provided by the third-party source comprises providing the piece of metadata provided by the third-party source to an administrator for review.

9. The system recited in claim 8, wherein the processor is further configured to perform a third overwriting of the field with a piece of metadata provided by the administrator.

10. The system recited in claim 9, wherein the processor is further configured to, based on the third overwriting of the field with the piece of metadata provided by the administrator, lock the field from further modification.

11. A method, comprising:

receiving, from a content player executing on a client device, an indication of content played by the content player, the indication comprising one or more pieces of metadata associated with the content;

selecting a set of one or more rules applicable to parsing the metadata associated with the content;

processing the metadata at least in part by applying the selected set of one or more parsing rules to at least a portion of the metadata associated with the content;

overwriting a field corresponding to an attribute of a content asset using at least some of the processed metadata associated with the content; and in response to receiving an indication of the overwriting, validating the at least some of the processed metadata used to overwrite the field.

12. The method of claim 11, further comprising recording a timestamp corresponding to the overwriting.

13. The method of claim 11, further comprising recording a source of the at least some of the processed metadata used to overwrite the field.

14. The method of claim 11, further comprising, based at least in part on the overwriting, incrementing a count of a number of times that the field has been overwritten.

15. The method of claim 11, wherein the validating comprises comparing the at least some of the processed metadata with metadata provided by a third-party source.

16. The method of claim 15, further comprising performing a second overwriting of the field in response to determining that the at least some of the processed metadata does not match to a piece of metadata provided by the third-party source, wherein the field is overwritten with the piece of metadata provided by the third-party source.

17. The method of claim 16, further comprising validating the second overwriting of the field with the piece of metadata provided by the third-party source.

18. The method of claim 17, wherein validating the second overwriting of the field with the piece of metadata provided by the third-party source comprises providing the piece of metadata provided by the third-party source to an administrator for review.

19. The method of claim 18, further comprising performing a third overwriting of the field with a piece of metadata provided by the administrator.

20. The method of claim 19, further comprising, based on the third overwriting of the field with the piece of metadata provided by the administrator, locking the field from further modification.

21. A computer program product embodied in a non-transitory computer readable storage medium and comprising computer instructions for:

receiving, from a content player executing on a client device, an indication of content played by the content player, the indication comprising one or more pieces of metadata associated with the content;

selecting a set of one or more rules applicable to parsing the metadata associated with the content;

processing the metadata at least in part by applying the selected set of one or more parsing rules to at least a portion of the metadata associated with the content;

overwriting a field corresponding to an attribute of a content asset using at least some of the processed metadata associated with the content; and in response to receiving an indication of the overwriting, validating the at least some of the processed metadata used to overwrite the field.

* * * * *